(12) United States Patent
Kojima et al.

(10) Patent No.: US 7,327,818 B2
(45) Date of Patent: Feb. 5, 2008

(54) SYNC PATTERN DETECTION METHOD AND APPARATUS

(75) Inventors: Tadashi Kojima, Yokohama (JP); Koichi Otake, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 623 days.

(21) Appl. No.: 10/740,535

(22) Filed: Dec. 22, 2003

(65) Prior Publication Data

US 2004/0131135 A1 Jul. 8, 2004

(30) Foreign Application Priority Data

Dec. 25, 2002 (JP) .............................. 2002-374519

(51) Int. Cl.
*H04L 7/00* (2006.01)
(52) U.S. Cl. .................. 375/368; 375/362; 714/814; D14/496
(58) Field of Classification Search ................ 375/362; 714/763, 814; 369/47.35, 59.25, 59.26; 386/126
See application file for complete search history.

(56) References Cited

U.S. PATENT DOCUMENTS 4,453,260 A * 6/1984 Inagawa et al. ............ 375/362
6,249,896 B1 * 6/2001 Ho et al. .................... 714/814

FOREIGN PATENT DOCUMENTS

| JP | 59-161144 A | 9/1984 |
| JP | 04-000925 A | 1/1992 |
| JP | 04-323928 A | 11/1992 |
| JP | 5-74147 | 3/1993 |
| JP | 6-164572 | 6/1994 |
| JP | 8-18549 | 1/1996 |
| JP | 2000-49739 | 2/2000 |

OTHER PUBLICATIONS

Japanese Office Action dated Feb. 8, 2005 for Appln. No. 2002-374519.

* cited by examiner

*Primary Examiner*—David C. Payne
*Assistant Examiner*—Adolf DSouza
(74) *Attorney, Agent, or Firm*—Pillsbury Winthrop Shaw Pittman, LLP

(57) ABSTRACT

A sync pattern detection apparatus includes a sync pattern detection unit configured to detect a sync pattern from an input signal, a plurality of sync pattern protection units configured to protect the sync pattern detected by the sync pattern detection unit, a reliability evaluation unit configured to evaluate the reliabilities of a plurality of sync pattern protection situations by the plurality of sync pattern protection units, and a selection unit configured to select a sync pattern protected by a predetermined sync pattern protection unit, on the basis of the reliability evaluation of the plurality of sync pattern protection situations by the reliability evaluation unit.

14 Claims, 17 Drawing Sheets

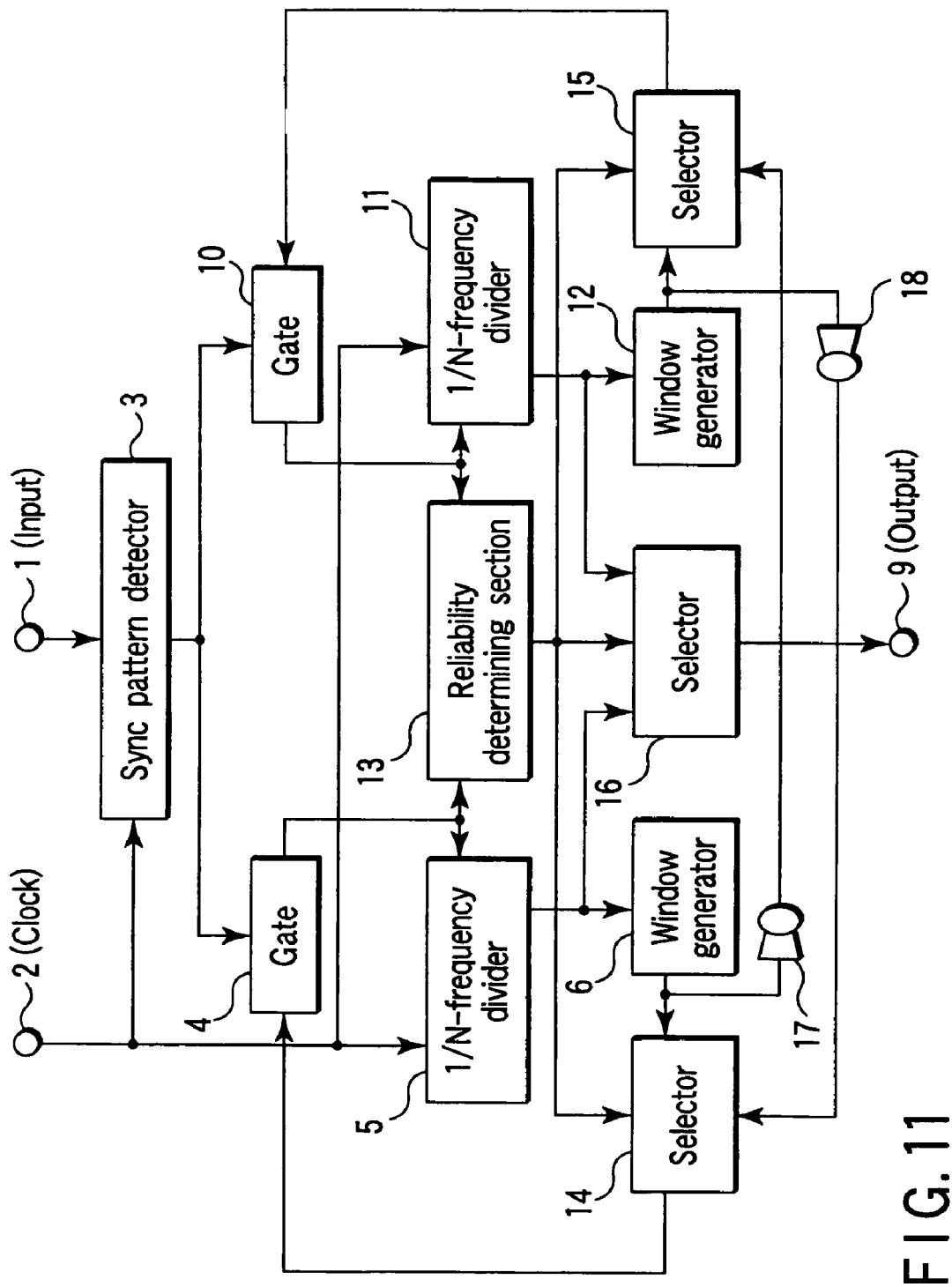
F I G. 11

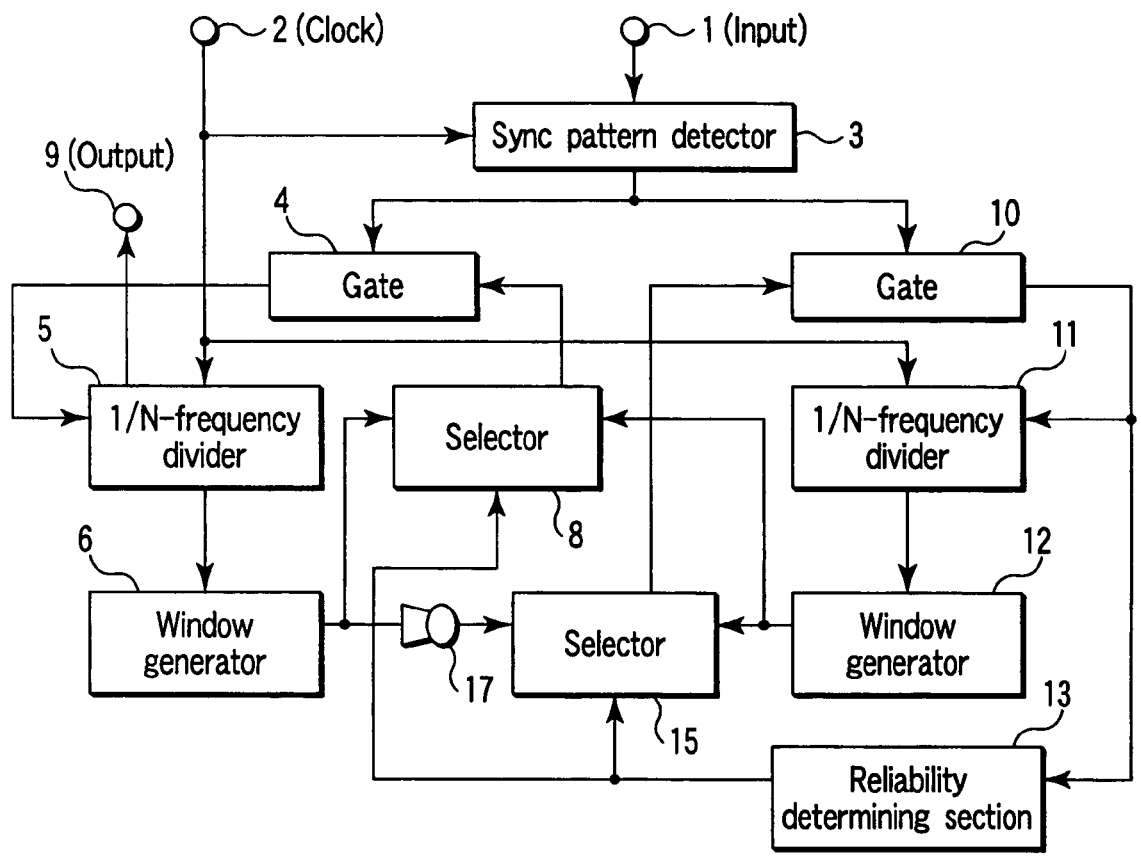
F I G. 15

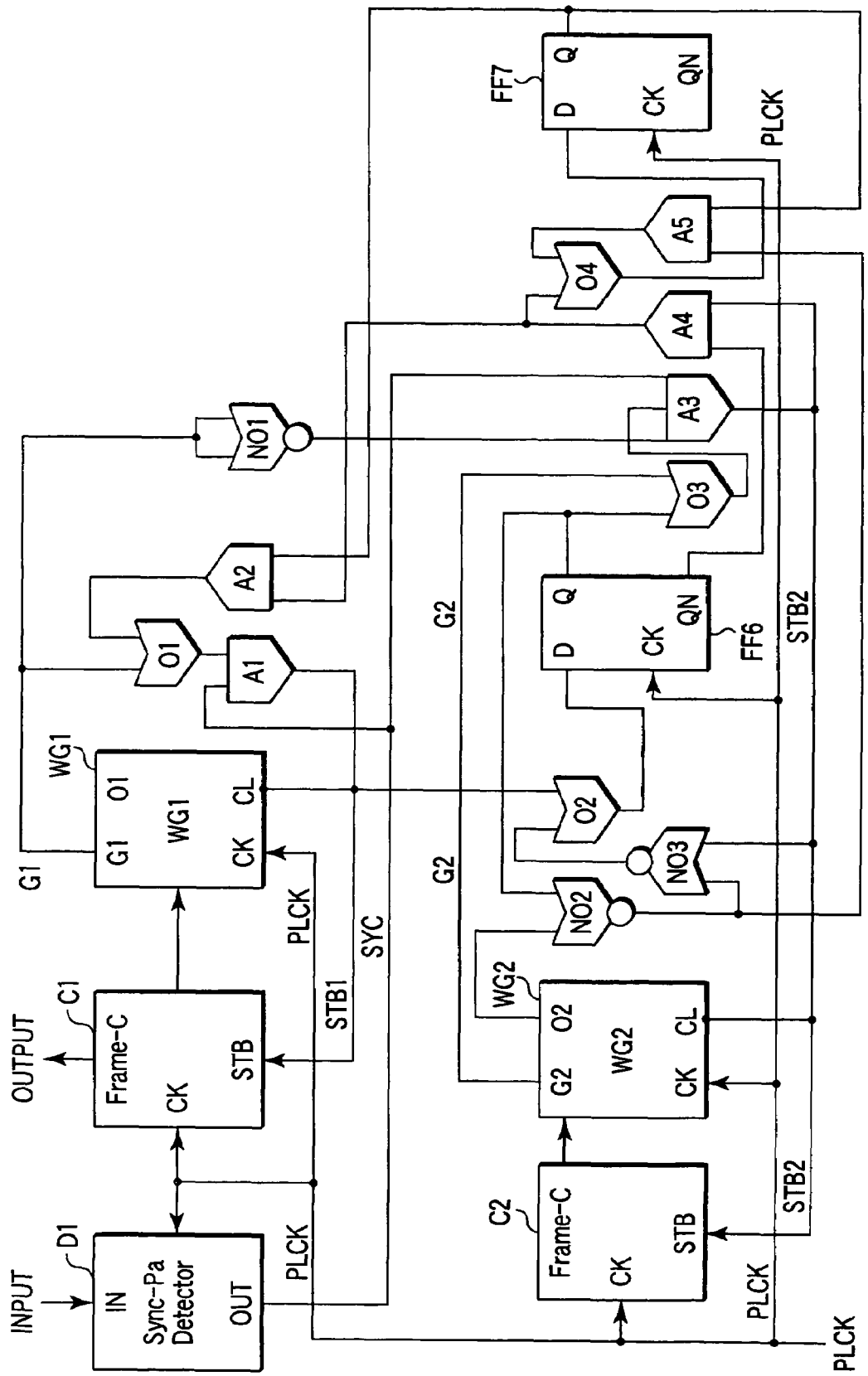
F I G. 16

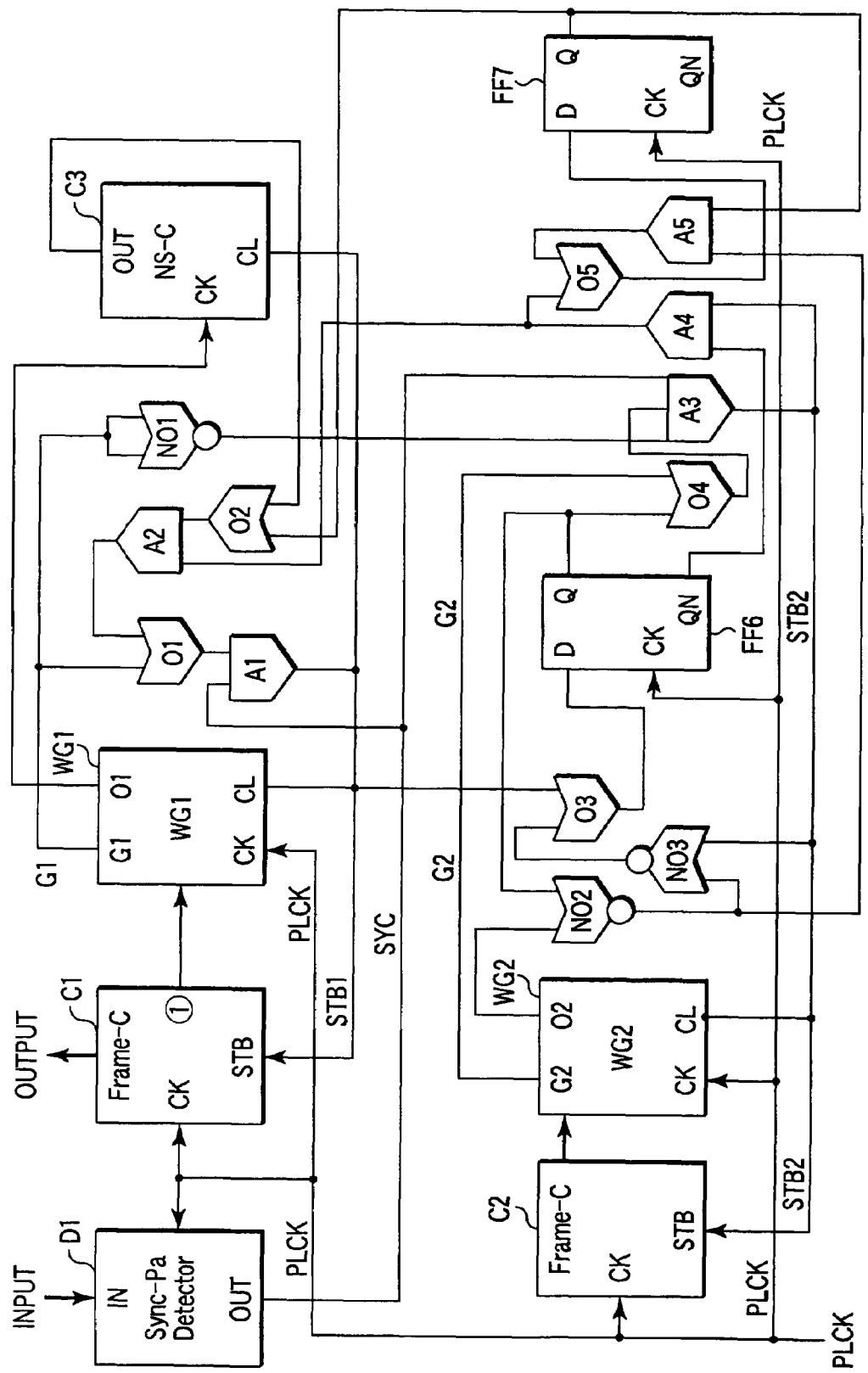
F I G. 20

SYNC PATTERN DETECTION METHOD AND APPARATUS

CROSS-REFERENCE TO RELATED APPLICATIONS

This application is based upon and claims the benefit of priority from the prior Japanese Patent Application No. 2002-374519, filed Dec. 25, 2002, the entire contents of which are incorporated herein by reference.

BACKGROUND OF THE INVENTION

1. Field of the Invention

The present invention relates to a sync pattern detection apparatus and method which detect a sync pattern inserted into a digital signal sequence at a predetermined interval.

2. Description of the Related Art

An ID number and other data are added to a specific unit of digital data to form a data block. An error-detecting code, an error-correcting code, and the like are added to the data block to form a data block with error code. When the data block with error code is to be recorded on a recording medium or transmitted to a transmission path, a sync pattern is inserted into the data block with error code at a predetermined interval at the time of data modulation processing.

In playback processing, a sync pattern is detected from a signal input to a playback processing apparatus. From the position of the sync pattern, the data is divided and demodulated for each symbol. In addition, data block arrangement information is obtained on the basis of order information from the sync pattern. Error-correcting processing and the like are executed to reconstruct a playback signal.

As described above, sync pattern detection is the most important function in the playback system. It is no exaggeration to say that the sync pattern detection capability decides the playback capability.

A sync pattern processing section detects a sync pattern, checks its reliability, and synchronizes the period counter (frame counter) of the sync pattern interval to the detection timing. Accordingly, a signal that controls data symbol division and demodulation of a digital signal stream and data block arrangement of demodulated data is generated. Functions that the sync pattern processing section is required of are as follows. The frame counter must be synchronized to the playback sync pattern. Even when a sync pattern is omitted due to a signal defect, playback control synchronization must be correctly established. The sync pattern processing section must not sense a pseudo sync pattern generated in modulated data. A read clock to be used to read a digital signal or sync pattern is generated from a playback signal stream by using a PLL (Phase Locked Loop) circuit. If a signal stream is destroyed by some error, the period of the PLL varies, resulting in a change in number of clocks between sync patterns. The sync pattern processing section must be configured to execute proper synchronization processing even in such a case.

To meet the requirements for sync detection protection, a synchronous circuit is proposed in Jpn. Pat. Appln. KOKOKU Publication No. 5-74147.

The sync pattern detection protection circuit disclosed in this prior art uses an asynchronous time limit control scheme to execute re-synchronization processing when it goes out of sync. This circuit is disadvantageous in that it has a plurality of combinations of frame counters and detection window generators because of its weak pseudo synchronization eliminating capability in the first re-synchronization, and it executes re-synchronization of the main frame counter only by a sync pattern that is confirmed in advance by the sub frame counter. In this sync pattern detection protection circuit, a synchronous state or an asynchronous state is detected on the basis of the length of the period without synchronization processing. That is, restoring from the asynchronous state to the synchronous state cannot be done in a short time.

BRIEF SUMMARY OF THE INVENTION

According to an aspect of the present invention, there is provided a sync pattern detection apparatus comprising a sync pattern detection unit configured to detect a sync pattern from an input signal, a plurality of sync pattern protection units configured to protect the sync pattern detected by the sync pattern detection unit, a reliability evaluation unit configured to evaluate reliabilities of a plurality of sync pattern protection situations by the plurality of sync pattern protection units, and a selection unit configured to select a sync pattern protected by a predetermined sync pattern protection unit, on the basis of reliability evaluation of the plurality of sync pattern protection situations by the reliability evaluation unit.

According to an aspect of the present invention, there is provided a sync pattern detection method applied to an apparatus comprising a sync pattern detection unit which detects a sync pattern from an input signal and a plurality of sync pattern protection units which protect the sync pattern detected by the sync pattern detection unit, comprising evaluating reliabilities of a plurality of sync pattern protection situations by the plurality of sync pattern protection units, and selecting a sync pattern protected by a predetermined sync pattern protection unit, on the basis of reliability evaluation of the plurality of sync pattern protection situations.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a block diagram showing a sync pattern detection apparatus according to the first embodiment of the present invention;

FIG. 15 is a block diagram showing a sync pattern detection apparatus according to the second embodiment of the present invention;

FIG. 16 is a block diagram showing the detailed arrangement of the sync pattern detection apparatus according to the second embodiment shown in FIG. 15;

FIG. 20 is a block diagram showing the detailed arrangement of the sync pattern detection apparatus according to the third embodiment shown in FIG. 19;

DETAILED DESCRIPTION OF THE INVENTION

The embodiments of the present invention will be described below with reference to the accompanying drawing.

An ID number and other data are added to a specific unit of digital data to form a data block. An error-detecting code, an error-correcting code, and the like are added to the data block to form a data block with error code. When the data block with error code is to be recorded on a recording medium or transmitted to a transmission path, a sync pattern is inserted into the data block with error code at a predetermined interval at the time of data modulation processing. For playback of this signal, sync pattern detection protection function is important. The present invention has been made to obtain a sync pattern detection protection scheme with advanced performance. A detailed description will be done below by using, as an example, a DVD scheme that is rapidly becoming popular.

Figure 1:
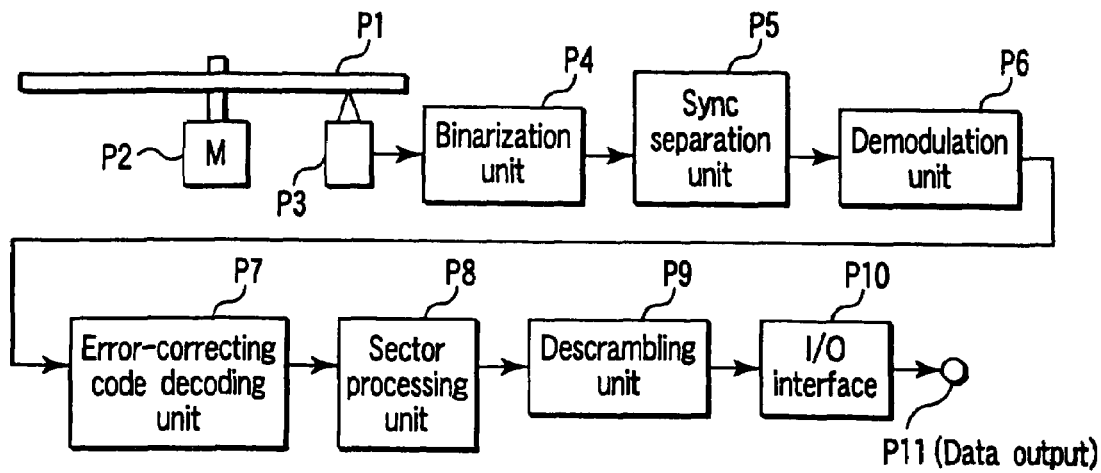
FIG. 1 is a block diagram showing an example of an information playback apparatus which plays back information recorded on an optical disk.

FIG. 1 shows the process steps of a DVD playback apparatus as functional units.

An optical pickup P3 reads out a signal from a DVD medium P1 whose rotation is controlled by a disk motor P2. The readout signal is converted into a "1"—or "0"—level signal by a binarization unit P4. The converted signal is converted into a channel bit stream signal by a read clock (PLCK) generated by a read clock generating PLL circuit. A sync separation unit P5 detects a sync pattern from the channel bit stream signal. A counter (to be referred to as a frame counter or a 1/N-frequency divider hereinafter) that counts the number of revolutions is synchronized to the period of the detected sync pattern. On the basis of the signal output from the synchronized counter, the channel bit stream signal is divided into symbol data sequentially from the sync pattern, sent to a demodulation unit P6, and demodulated into the original data. Error data in the demodulated data is corrected by an error-correcting code decoding unit P7. The data is packetized into a format corresponding to each sector by a sector processing unit P8. A descrambling unit P9 cancels the scrambling of the data to reconstruct the original data and supplies it to an I/O interface P10. The I/O interface P10 outputs the supplied data to the outside. Data recorded on a DVD is scrambled to prevent identical data from continuing. This is because if identical data continue, the servo in the DVD playback apparatus becomes unstable.

Figure 2:
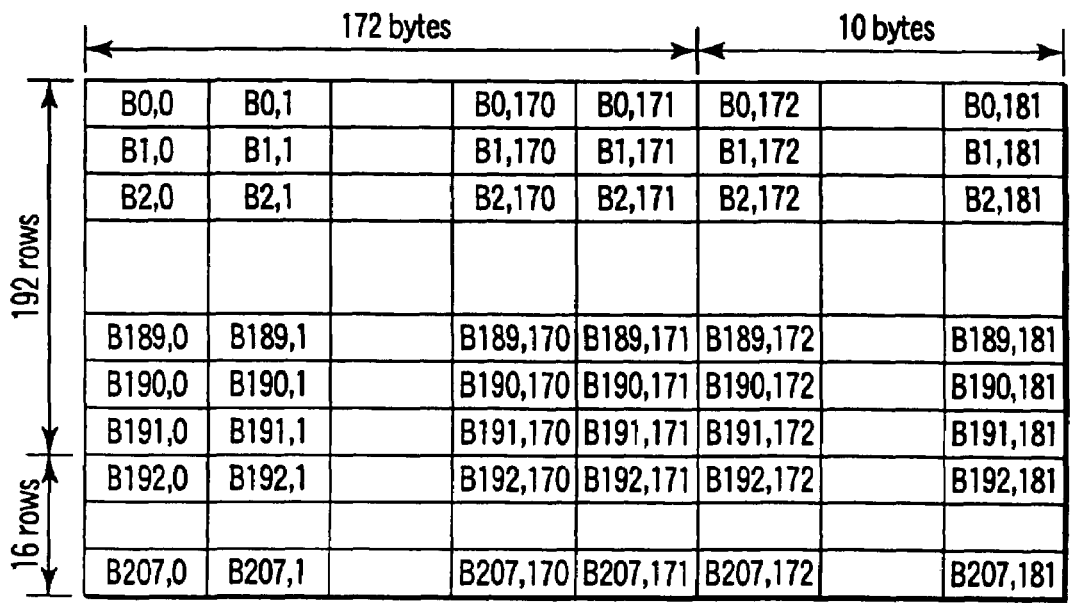
FIG. 2 is a view showing an example of the data structure of an ECC block recorded on a DVD.

FIG. 2 shows the structure of an ECC block on a DVD. A data block is constructed by columns each having 172 bytes and 192 rows. That is, a data block is constituted by 172×192 bytes. A 16-byte error-correcting outer code "PO" is added in the column direction of the data block. A 10-byte error-correcting inner code "PI" is added in the row direction. Thus, an ECC block having 182 bytes×208 bytes is formed.

Figure 3:
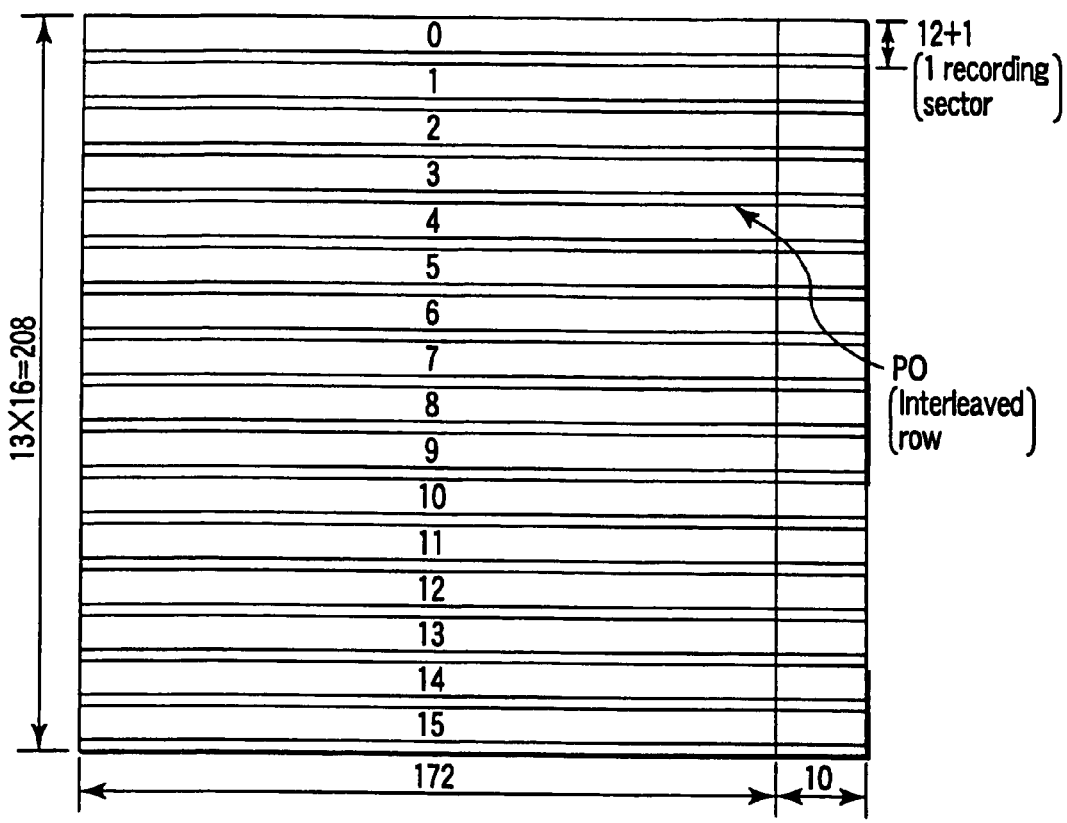
FIG. 3 is a view showing a state wherein the arrangement of data contained in the ECC block shown in FIG. 2 is converted, and 16 recording sectors are generated from the ECC block.

FIG. 3 shows a state wherein the arrangement of data contained in the ECC block shown in FIG. 2 is converted, and 16 recording sectors are generated from the ECC block. Each of the 16 rows of the PO shown in FIG. 2 is extracted and inserted every 12th row of the 192 rows. This processing will be referred to as row interleave. With this processing, recording sectors each having (12+1) rows are formed.

Figure 4:
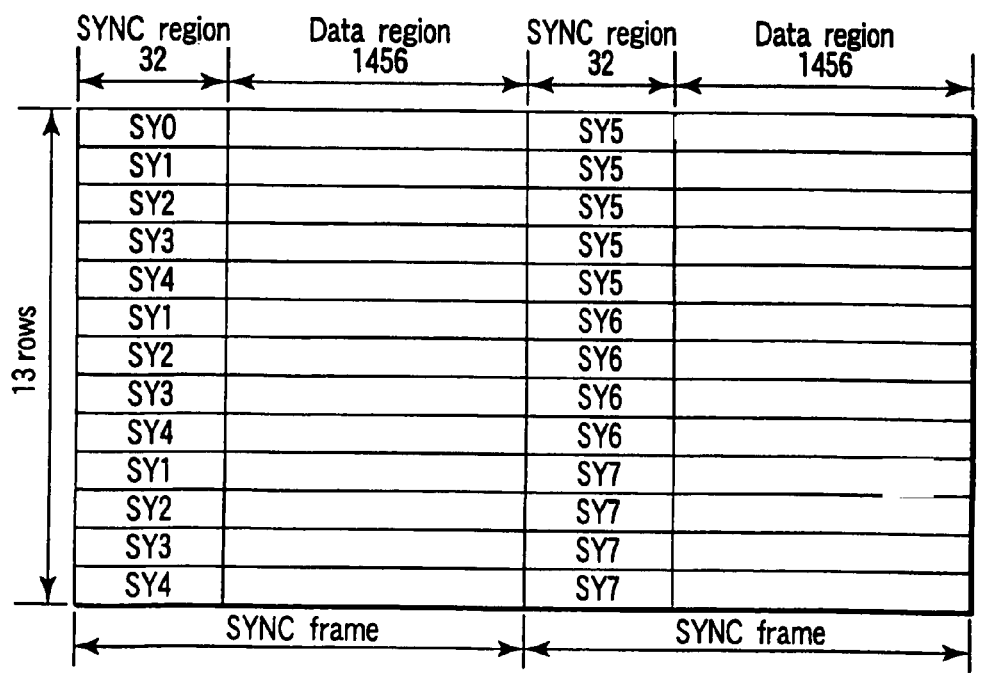
FIG. 4 is a view showing the data structure of a physical sector which is generated, by adding sync patterns to a recording sector shown in FIG. 3, to actually record the recording sector.

FIG. 4 is a view showing a physical sector which is generated, by adding sync patterns to a recording sector shown in FIG. 3, to actually record the recording sector. There are eight sync patterns SY0 to SY7 (each sync pattern "SY*" actually has four patterns to, e.g., suppress the DC component of a recording signal). Each sync pattern is constituted by 32 channel bits. A data region following a sync pattern is obtained by dividing a row having (172+10=182) bytes in FIG. 3 into two parts and converting each byte into 16 channel bits. That is, (172+10)/2=91 bytes, and 91×16=1456 channel bits. As a result, one row is constituted by two SYNC frames. The row arrangement can be determined on the basis of the combination of sync patterns in each row.

A signal converted into such a physical sector is recorded on a medium. In playback processing by the system shown in FIG. 1. the signal is read out as channel bits and divided into symbols each having 16 channel bits sequentially from the sync pattern. With this processing, demodulated data can be obtained for every byte by the demodulator. If the starting point of sync pattern detection shifts by one channel bit, the entire SYNC frame becomes error data. A sync pattern detected from an input signal may be used, but the sync pattern may be destroyed by a defect or the like. In addition, the data region may change to the same pattern as the sync pattern. Hence, the detected sync pattern cannot be directly used.

In a general method, playback synchronization processing is executed on the basis of the output signal from a frame counter that rotates in accordance with the distance of a SYNC frame, and the frame counter is synchronized to the detected sync pattern, as will be described below with reference to FIGS. 5 and 6.

Figure 6:
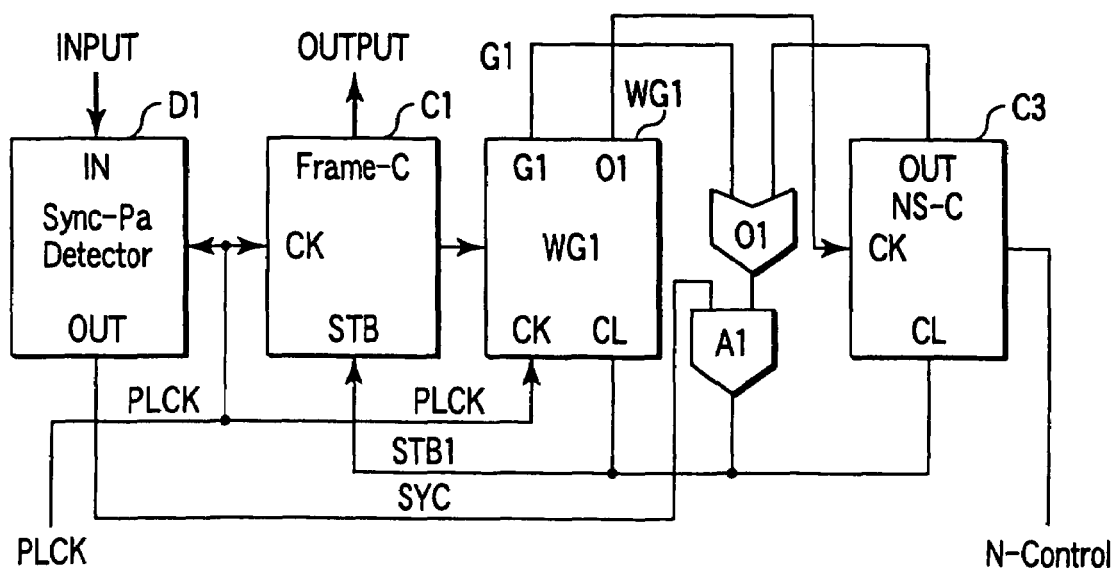
FIG. 6 is a block diagram showing the detailed arrangement of the sync pattern detection apparatus shown in FIG. 5.

A sync pattern detection protection scheme as shown in FIG. 6 can cope with various problems described above. In this scheme, an asynchronous state when the system goes out of sync is detected on the basis of the number of frames without synchronization. Hence, a long time is taken for detection.

Figure 5:
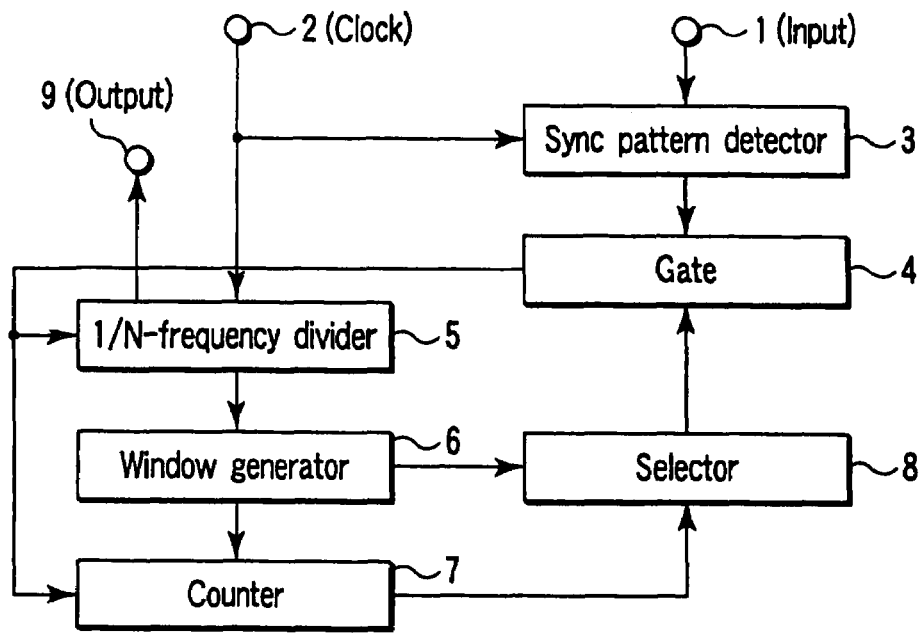
FIG. 5 is a block diagram showing an example of a sync pattern detection apparatus.

FIG. 5 is a block diagram showing an example of a sync pattern detection apparatus.

A clock 2 bit-synchronized to an input signal 1 is supplied to a sync pattern detector 3 and 1/N-frequency divider 5. The 1/N-frequency divider 5 outputs, as an output signal 9, a sync control signal to be used for system control. As the basic operation, the output signal from the 1/N-frequency divider 5 is supplied to a window generator 6. A window signal having a predetermined width on both sides of the position of the frame interval (frame distance) is generated from the timing synchronized by a precedingly detected sync pattern. The window signal is supplied to a gate 4 through a selector 8. An SYC is sent to the 1/N-frequency divider 5 by turning on the switch for the output (SYC) signal from the sync pattern detector 3, thereby executing synchronization processing. Even when the SYC is detected at a point other than the window signal as the output from the window generator 6, the SYC is not supplied to the 1/N-frequency divider 5. For this reason, even when a pseudo SYC is detected, the 1/N-frequency divider 5 does not execute any erroneous synchronization processing. However, if the window clock 2 is generated at a specific portion by an incorrect frequency, the window signal shifts from the correct SYC generation position. To prevent this, the output signal from the output signal 9 is counted by a counter 7. That no SYC is supplied to the 1/N-frequency divider 5 between a designated number of frames is detected. Until the SYC is supplied to the 1/N-frequency divider 5, the output from the counter 7 is passed through the selector 8 to turn on the switch of the gate 4. When the SYC that has passed through the gate is supplied, the counter 7 is cleared. In this operation, if the 1/N-frequency divider 5 goes out of sync, re-synchronization is forcibly executed in accordance with the output signal from the counter.

Figure 7:
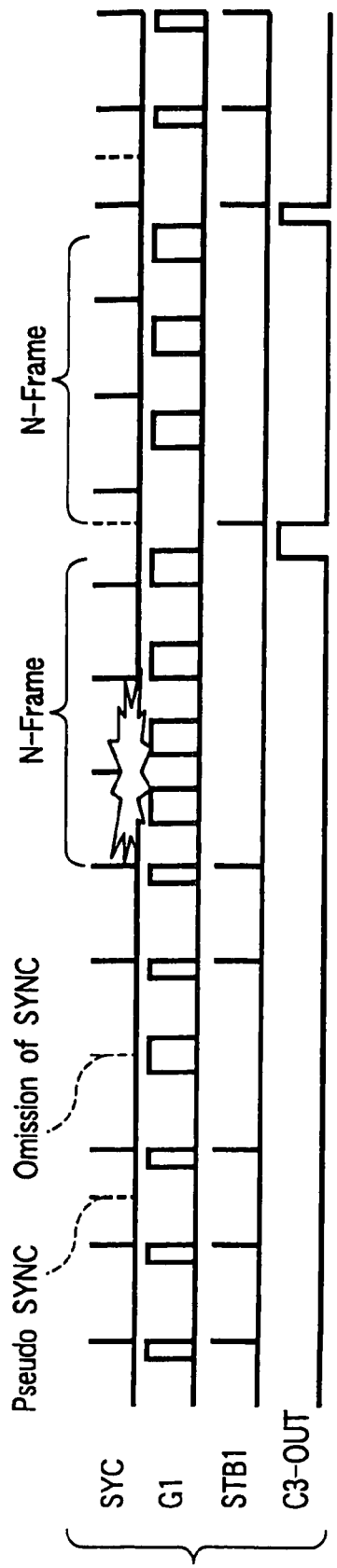
FIG. 7 is a timing chart showing the operation of the sync pattern detection apparatus shown in FIG. 6.

FIG. 6 is a block diagram showing the detailed arrangement of the apparatus shown in FIG. 5. FIG. 7 is a timing chart showing the operation of the apparatus shown in FIG. 6.

A sync pattern detector D1, 1/N-frequency divider (frame counter) C1, window generator WG1, counter (no sync counter) C3, AND-gate A1, and OR-gate O1 are connected as shown in FIG. 6. As shown in FIG. 7, a window signal G1 is generated from a position separated from an SYC detection position by a predetermined length of time. An SYC is detected in the window signal so that the 1/N-frequency divider C1 is synchronized.

The window signal G1 is detected again from a position separated from the next SYC detection position by a predetermined length of time. The 1/N-frequency divider C1 is a cycle counter. Hence, if an SYC is omitted, the 1/N-frequency divider C1 repeats the count operation from the position where the SYC should be detected. When an SYC is detected again in the window signal, the 1/N-frequency divider C1 is synchronized by the SYC. In this operation, if a defect occurs and disturbs the clock (PLCK), the timing between the window signal and the SYC shifts. In this case, the counter C3 counts the number of asynchronous frames. When the count value reaches a designated value, a signal is generated from the OUT of the counter C3 to supply the SYC to the 1/N-frequency divider C1 without any window limitation. If the SYC used for the first re-synchronization is a pseudo SYC, the counter counts the designated number of asynchronous frames again. Synchronization is executed again in accordance with the SYC. As described above, in the scheme shown in FIGS. 5, 6, and 7, if a pseudo SYC is generated at the first re-synchronization, a long time is required until synchronization is properly established. Hence, data divided into symbols cannot be correctly read. To solve this problem, a sync pattern detection apparatus shown in FIG. 8 is proposed.

Figure 8:
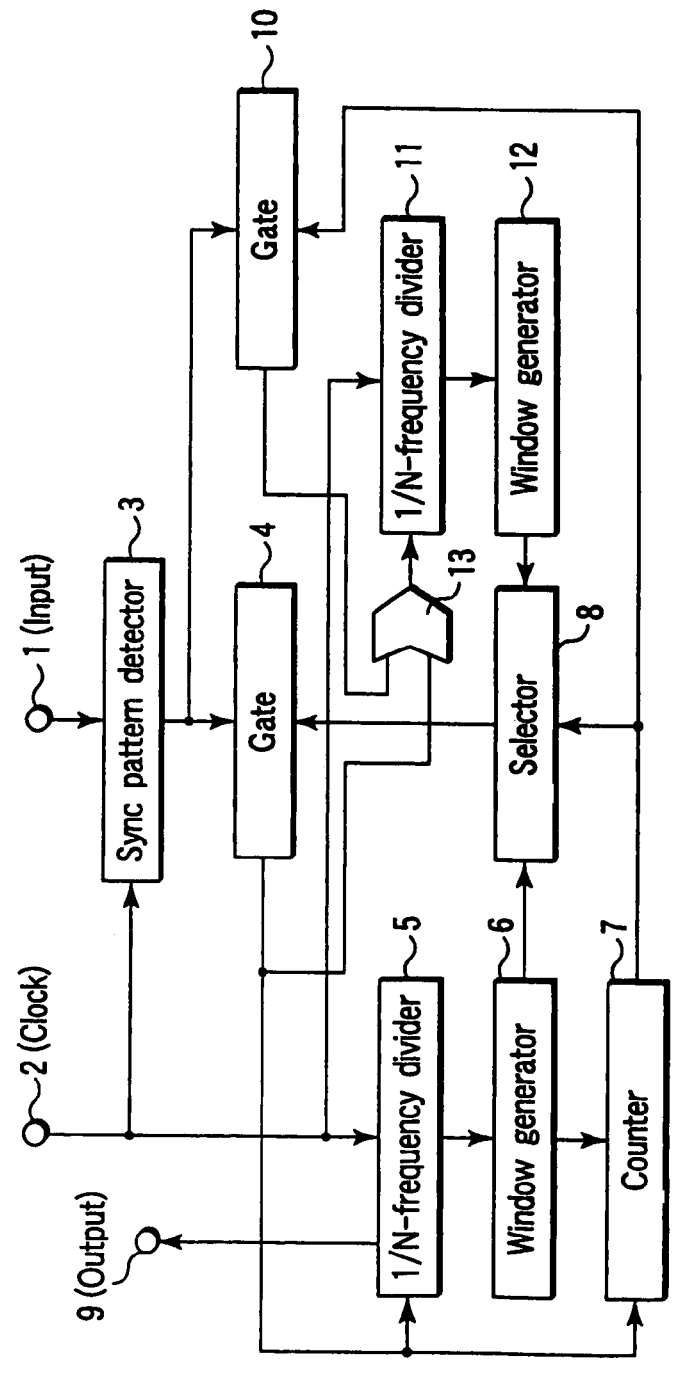
FIG. 8 is a block diagram showing another example of the sync pattern detection apparatus.

FIG. 8 is a block diagram showing another example of the sync pattern detection apparatus. This sync pattern detection apparatus is different from that shown in FIG. 5 in that a 1/N-frequency divider 11 and window generator 12 are arranged in addition to the 1/N-frequency divider 5 and window generator 6. Also, only one of the window signals from the window generators 6 and 12 is used as the switch signal to supply an SYC to the 1/N-frequency divider 5.

Figure 9:
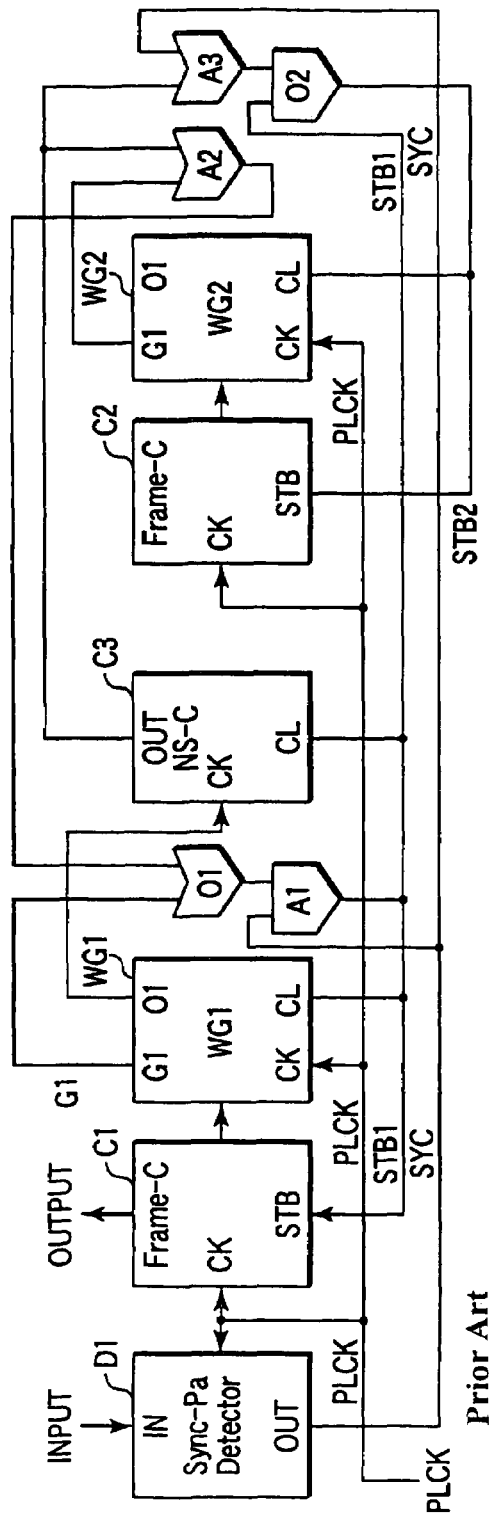
FIG. 9 is a block diagram showing the detailed arrangement of the sync pattern detection apparatus shown in FIG. 8.
Figure 10:
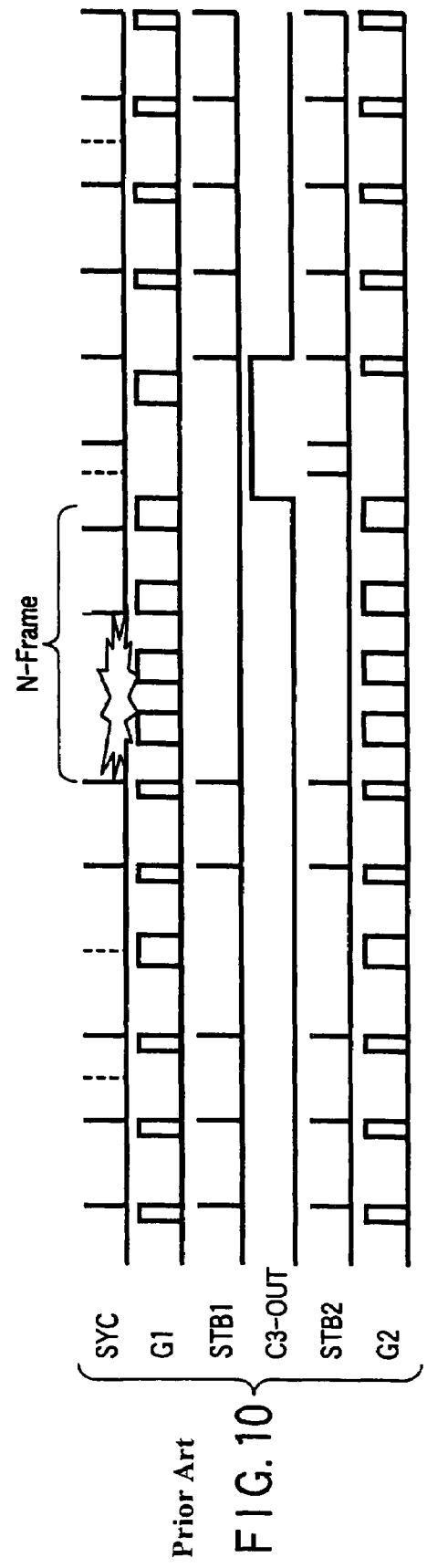
FIG. 10 is a timing chart showing the operation of the sync pattern detection apparatus shown in FIG. 9.

The output signal from the counter 7 is used as a signal to select the window generator 6 or 12. More specifically, when synchronization is not executed during a predetermined period, a gate 10 for synchronization of the 1/N-frequency divider 11 is forcibly turned on to synchronize the auxiliary 1/N-frequency divider. Since the gate 4 is turned on by the window signal generated by the window generator 12 at that time, a pseudo SYC is hardly supplied to the 1/N-frequency divider 5. FIG. 9 is a block diagram showing the detailed arrangement of the apparatus shown in FIG. 8. FIG. 10 is a timing chart showing the operation of the apparatus shown in FIG. 9.

As shown in FIG. 9, in addition to the components shown in FIG. 6, a 1/N-frequency divider (frame counter) C2, window generator WG2, AND-gates A2 and A3, and OR-gate 02 are added. An SYC is first sent to the 1/N-frequency divider C2 in accordance with the output from the counter C3. Only when an SYC is generated at the output timing of the window generator WG2, the SYC for synchronization is supplied to the 1/N-frequency divider C1. As shown in FIG. 10, the SYC is first supplied to the 1/N-frequency divider C2 in accordance with the OUT signal from the counter C3. Only when an SYC is generated in the window signal generated in the next frame, the 1/N-frequency divider C1 is synchronized. As shown in the timing chart of FIG. 10, even when the OUT signal from the counter C3 is turned on, and a pseudo SYC is generated for the first time, the counter C3 is not cleared. When SYCs are continuously generated for a correct frame distance, the 1/N-frequency divider C1 is synchronized, and the counter C3 is cleared. For this reason, even when a pseudo SYC is generated, no synchronization delay occurs, unlike FIG. 5.

When an asynchronous state is set in FIG. 10, re-synchronization processing is not executed before the counter C3 shown in FIG. 9 counts a designated number of frames. All data in (N-Frame)+(C3-OUT) in FIG. 10 are error data. Even when data after symbol data division and demodulation is used for error-correction processing, an error beyond the correction capability may be generated. The signal omission region shown in FIG. 10 is an error. In a region after it, however, when the read clock (PLCK) restores the normal state, even demodulated data is preferably read as correct data.

Sync pattern detection apparatuses shown in FIGS. 11 to 19 can solve the above-described problem. More specifically, a plurality of sync protection units that generate a playback processing sync pattern to be used for playback processing are always operated. When the main sync protection unit is set in an asynchronous state, the other unit establishes synchronization in a short time to set a synchronous state. With this arrangement, the asynchronous period can be made very short. This will be described in more detail. A plurality of sync pattern detection protection systems or, for example, two systems are always operated. Regions except the detection windows of a sync detection protection system that is currently being used for control are monitored by the other sync pattern detection protection system. When the system on the monitoring side ensures the reliability of a synchronous state, the system on the monitoring side is used as the playback control synchronization section.

The number N of asynchronous state detection frames in FIG. 5 or 9 is set to about 10 in consideration of the reliability. According to such a system, in correction processing for data as shown in FIG. 2, once an asynchronous state is generated, it continues over 12 or more frames. Since six or more rows become error data in FIG. 2, the error may sometimes be beyond the correction capability.

FIG. 11 is a block diagram showing a sync pattern detection apparatus according to the first embodiment of the present invention. The apparatus has almost the same components as in FIG. 8. In the sync pattern detection apparatus shown in FIG. 11, however, a sync pattern protection system (to be referred to as a protection system A hereinafter) comprises a gate 4, 1/N-frequency divider 5, window generator 6, and selector 14. Similarly, an independent sync pattern protection system (to be referred to as a protection system B hereinafter) comprises a gate 10, 1/N-frequency divider 11, window generator 12, and selector 15. The situation of each protection system is determined by a reliability determining section 13 to decide which protection system output should be used as a playback control sync pattern. In this case, if the output from the system A is currently being used as the playback control sync pattern, it is important that the system B always detects regions except window generator outputs of the system A. If the window output of the system A is separated from the playback sync pattern (asynchronous state), the system B can quickly detect a reliable sync pattern. When the reliability determining section 13 determines that sync pattern detection protection on the side of the system B has a higher reliability, a selector 16 changes the playback control sync-pattern to the side of the system B. As a consequence, the system A detects the sync pattern in regions other than window generator outputs of the system B. In the scheme shown in FIG. 11, when the playback sync pattern detected by a sync pattern detector 3 synchronizes the 1/N-frequency divider (frame counter), the playback sync pattern is always protected by the window generator. Each of the two detection protection systems monitors regions except the window generator regions of the other system as detection protection regions. With this arrangement, even when the sync pattern detection protection system that is currently being used is set in an asynchronous state, the playback control sync pattern can quickly be returned to the correct synchronous state.

Figure 12:
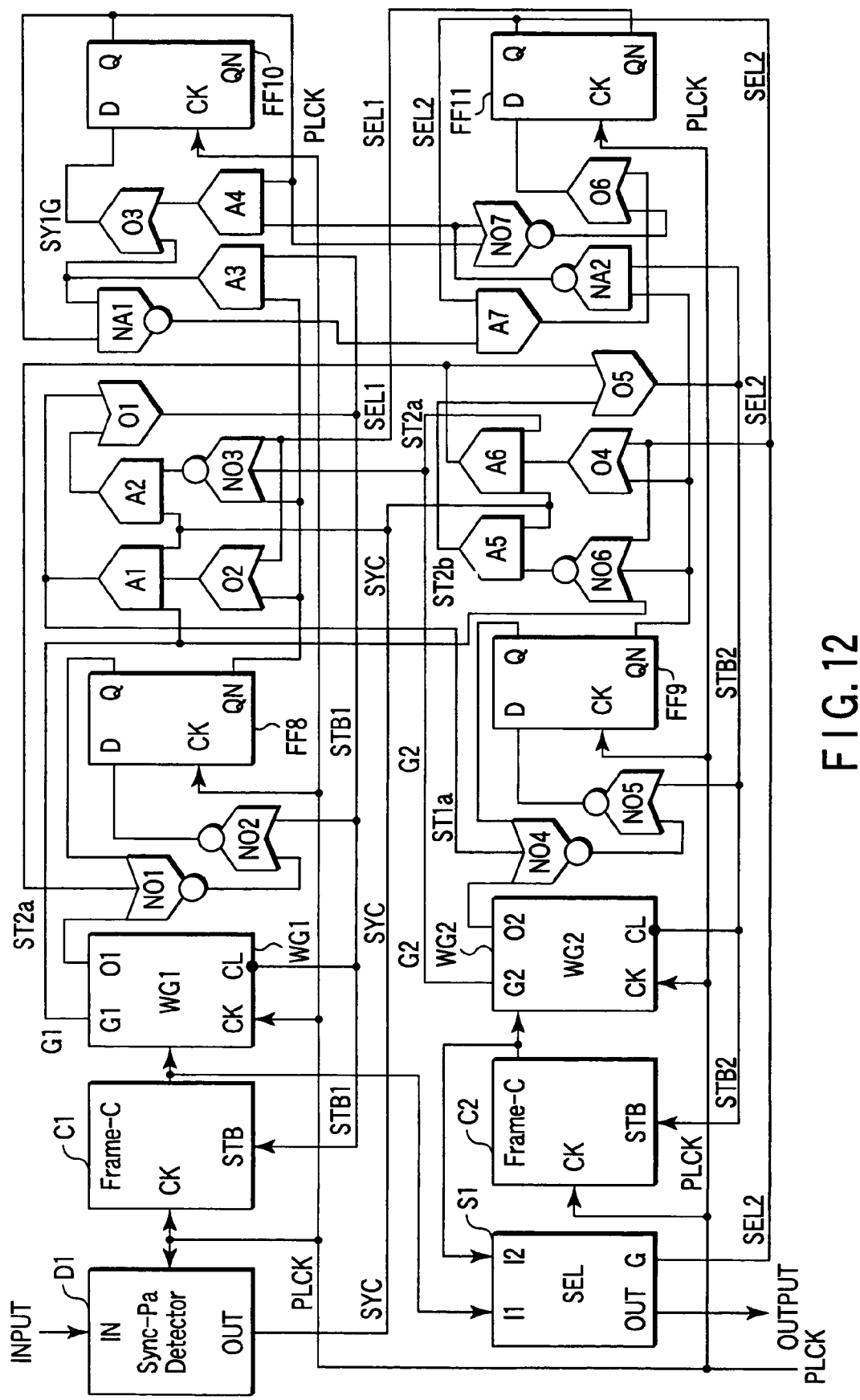
FIG. 12 is a block diagram showing the detailed arrangement of the sync pattern detection apparatus according to the first embodiment shown in FIG. 11.
Figure 13:
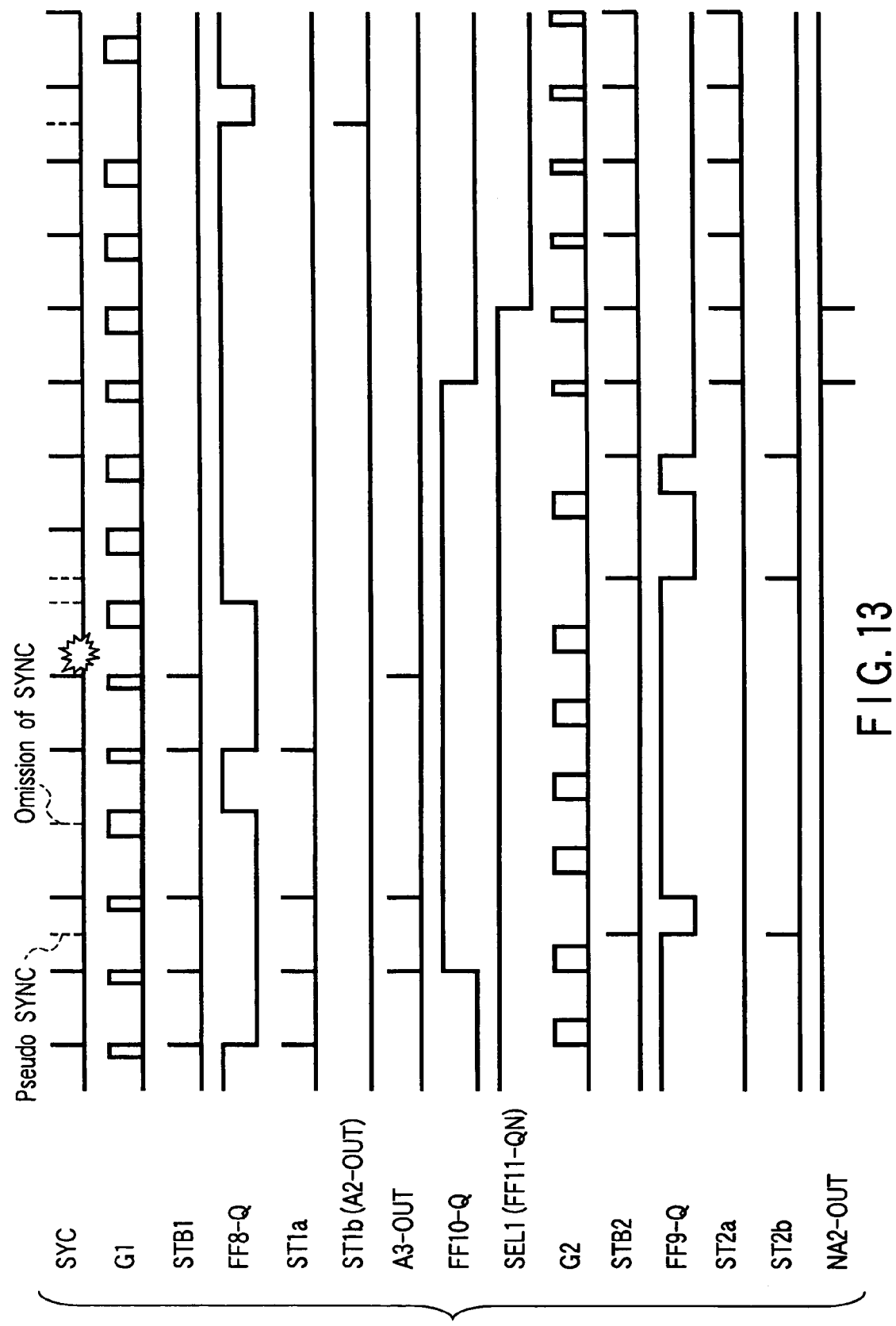
FIG. 13 is a timing chart showing the operation of the sync pattern detection apparatus according to the first embodiment shown in FIG. 12.
Figure 14:
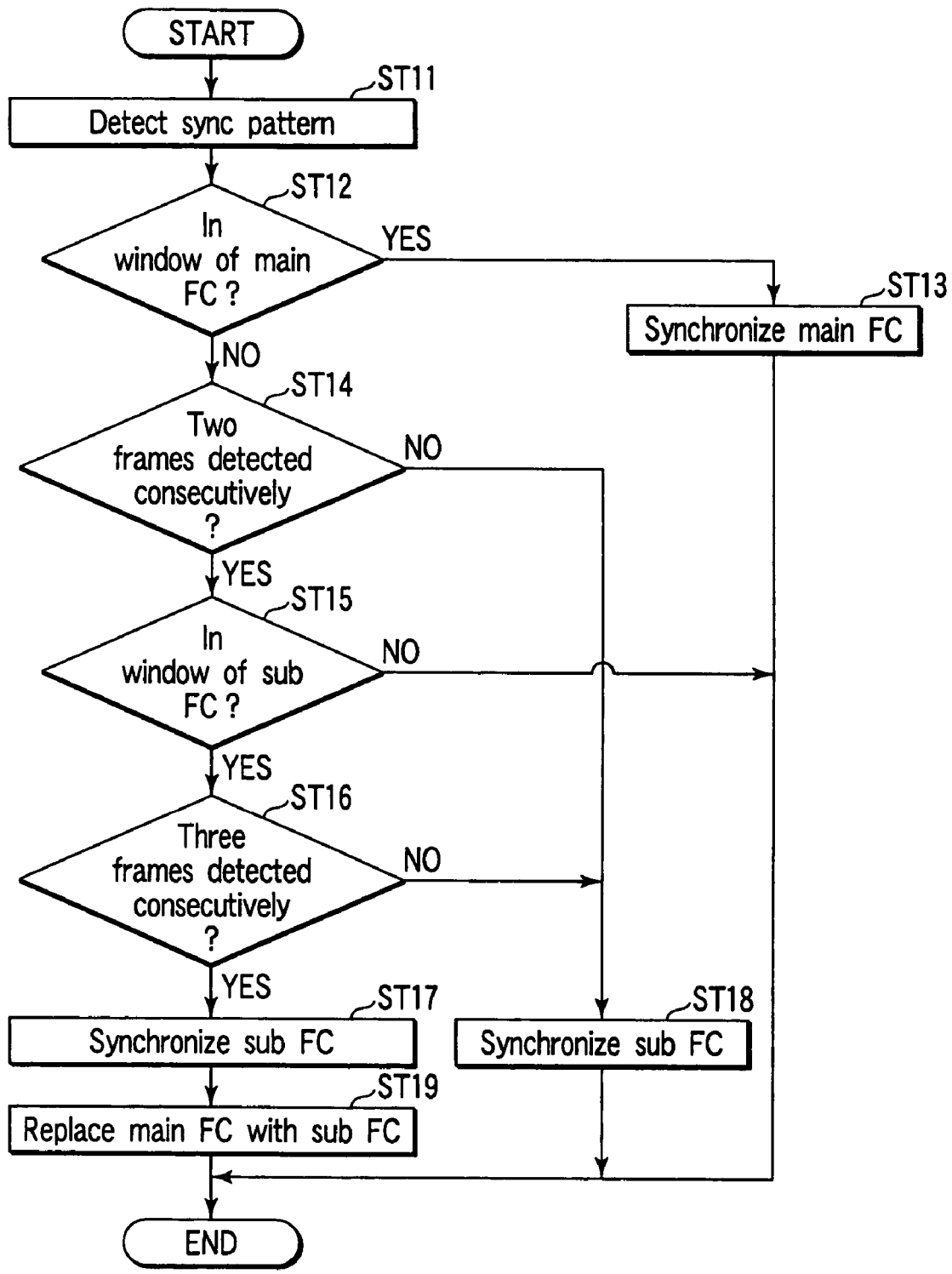
FIG. 14 is a flow chart showing the operation of the sync pattern detection apparatus according to the first embodiment shown in FIGS. 11 and 12.

FIG. 12 is a block diagram showing the detailed arrangement of the sync pattern detection apparatus according to the first embodiment shown in FIG. 11. FIG. 13 is a timing chart showing the operations of the circuits shown in FIG. 12. FIG. 14 is a flow chart showing the operation of the sync pattern detection apparatus according to the first embodiment shown in FIGS. 11 and 12. Of the systems A and B, a system which is currently outputting a signal will be referred to as a main FC, and the other system will be referred to as a sub FC.

The sync pattern detector 3 shown in FIG. 11 corresponds to a sync pattern detector D1 shown in FIG. 12. The sync pattern detection protection system A comprises a 1/N-frequency divider (frame counter) C1, window generator WG1, gate A1 (AND-gate), gate A2 (AND-gate), gate O1 (OR-gate), gate O2 (OR-gate), and gate NO3 (NOR-gate). Similarly, the system B comprises a 1/N-frequency divider (frame counter) C2, window generator WG2, gate A6 (AND-gate), gate A5 (AND-gate), gate O5 (OR-gate), gate O4 (OR-gate), and gate NO6 (NOR-gate).

A D-FF circuit FF10, D-FF circuit FF11, and gate circuits connected to the D input terminals constitute the reliability determining section 13. The output from the D-FF circuit FF11 is the select signal for the playback control sync pattern. An operation executed when the output from the system A is selected as the sync pattern output (FF11-Qn=SEL1=1) will be described with reference to FIG. 13.

When a sync pattern SYC is detected in a window output G1 from the window generator WG1 (ST11) (YES in ST12), a synchronization signal STB1 is output from the gates A1 and O1 so that the 1/N-frequency divider C1 is synchronized (ST13). Even when a pseudo SYNC is detected between correct SYNCs, the gate circuit on the side of the system A eliminates the signal. On the other hand, when the system B detects a SYNC (SYC) in a region other than the region of the window signal G1 of the system A (ST11) (NO in ST12), the output from the gates NO6 and A5 of the system B changes to "H" to generate STB2 so that the 1/N-frequency divider C2 is synchronized by the pseudo SYNC. When the STB2 is generated, a D-FF circuit FF9 is set to "0", and the gate NO6 changes to "L". For this reason, reception of the STB2 is unconditionally inhibited. When a SYNC is detected in a window signal G2 of the system B, which is generated in accordance with the next frame distance, it is detected that synchronization to the detected sync pattern is executed twice consecutively on the side of the system B (YES in ST14) (YES in ST15). In this case, since the 1/N-frequency divider C2 is synchronized by the pseudo SYNC, no SYNC is detected for the next frame distance. Hence, the D-FF circuit FF9 is reset to the initial state "1".

Even on the side of the system A, every time the STB1 is generated, a D-FF circuit FF8 is set to "0". Accordingly, it is recognized that synchronization processing is normally executed. If a defect is generated in this state, and a read clock PLCK causes an error state in a certain region, the window signal G1 and SYNC detection position have a shift even after normal operation is restored, and no STB1 is detected. The system B receives the SYNC only in regions other than the regions of the window signal G1. When a pseudo SYNC is detected, synchronization to the pseudo SYNC is established first. Next, since no SYNC is detected in the window signal G2, the initial state is set. The 1/N-frequency divider C2 is synchronized to the next correct SYNC. When the next SYNC is consequently detected in the window signal G2, a gate NO2 of the reliability detection section changes to "0" to reset the D-FF circuit FF10 (the D-FF circuit FF10 is set to "0"). When a SYNC is generated in the window signal G2 generated in the next frame, a gate NO7 changes to "H". The D-FF circuit FF11 is to "1" to change to "SEL1=L" and "SEL2=H". Accordingly, the system B outputs the playback control sync pattern. In this way, when the system B detects the SYNC twice consecutively in accordance with the frame distance (YES in ST16), the SEL signal is changed. The SEL2 changes to "1" so that the output signal is switched by the selector 16 (ST17 to ST19). As described above, two synchronization protection systems, i.e., the systems A and B are constituted. Regions other than the window signal regions on the playback control sync pattern output side are always detected on the other protection system side. With this arrangement, an asynchronous state can quickly be determined, and a correct playback control sync pattern can be created.

FIG. 15 is a block diagram showing a sync pattern detection apparatus according to the second embodiment of the present invention. In the sync pattern detection apparatus according to the first embodiment shown in FIG. 11, a playback control sync pattern is output by switching between the outputs from the systems A and B (1/N-frequency dividers). In the sync pattern detection apparatus according to the second embodiment shown in FIG. 15, systems A and B are prepared, and the system A always outputs a playback control sync pattern. That is, the switching part is omitted. The system A is synchronized by the window signal of either the system A or the system B. The system A is normally synchronized by the window signal of the system A. The system B waits for a detected sync pattern outside the window signal region of the system A. As in the system B of the sync pattern detection apparatus according to the first embodiment shown in FIG. 11, when a SYNC with the frame distance is detected consecutively three times, the reliability detection circuit sends a selector signal to a selector 8 such that the window signal of the system B is used as the window signal of the system A. Accordingly, the system A is synchronized by the window signal of the system B.

Figure 17:
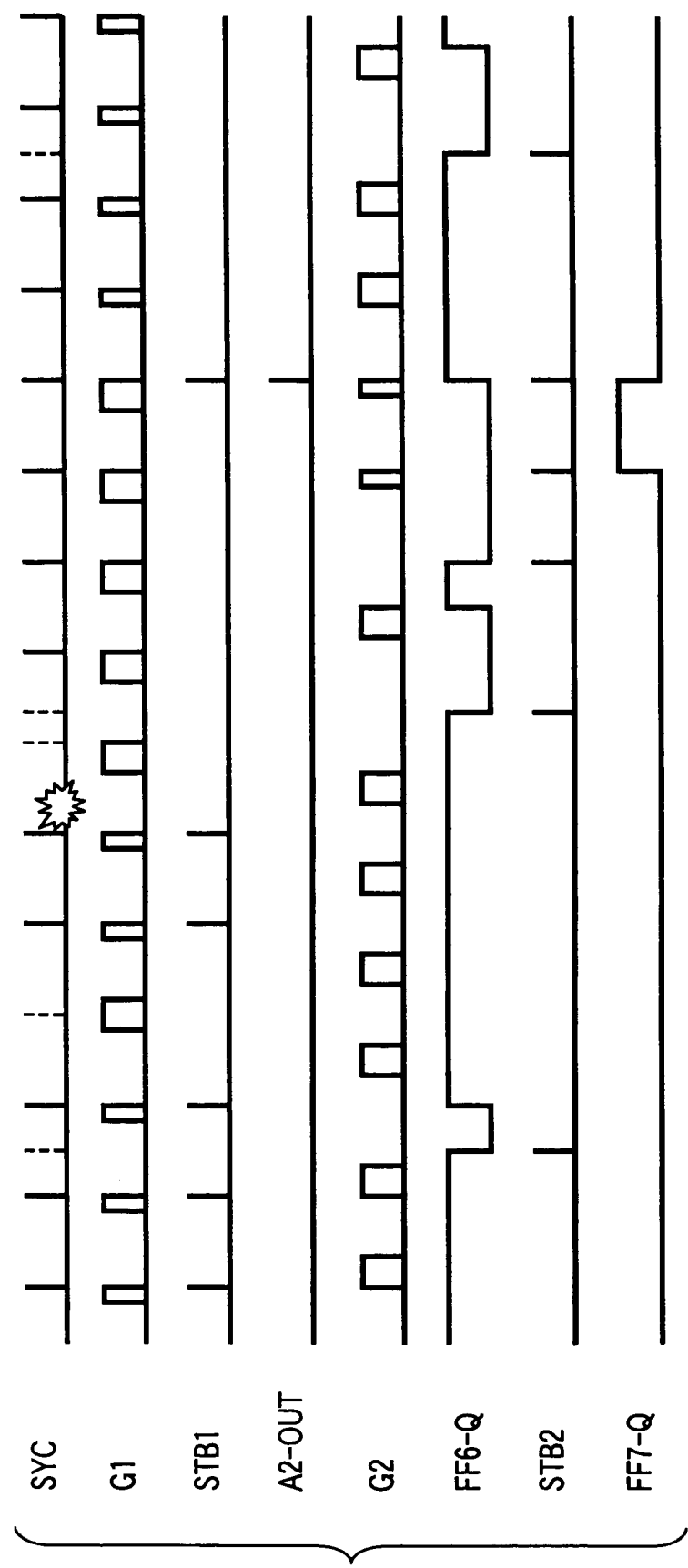
FIG. 17 is a timing chart showing the operation of the sync pattern detection apparatus according to the second embodiment shown in FIG. 16.
Figure 18:
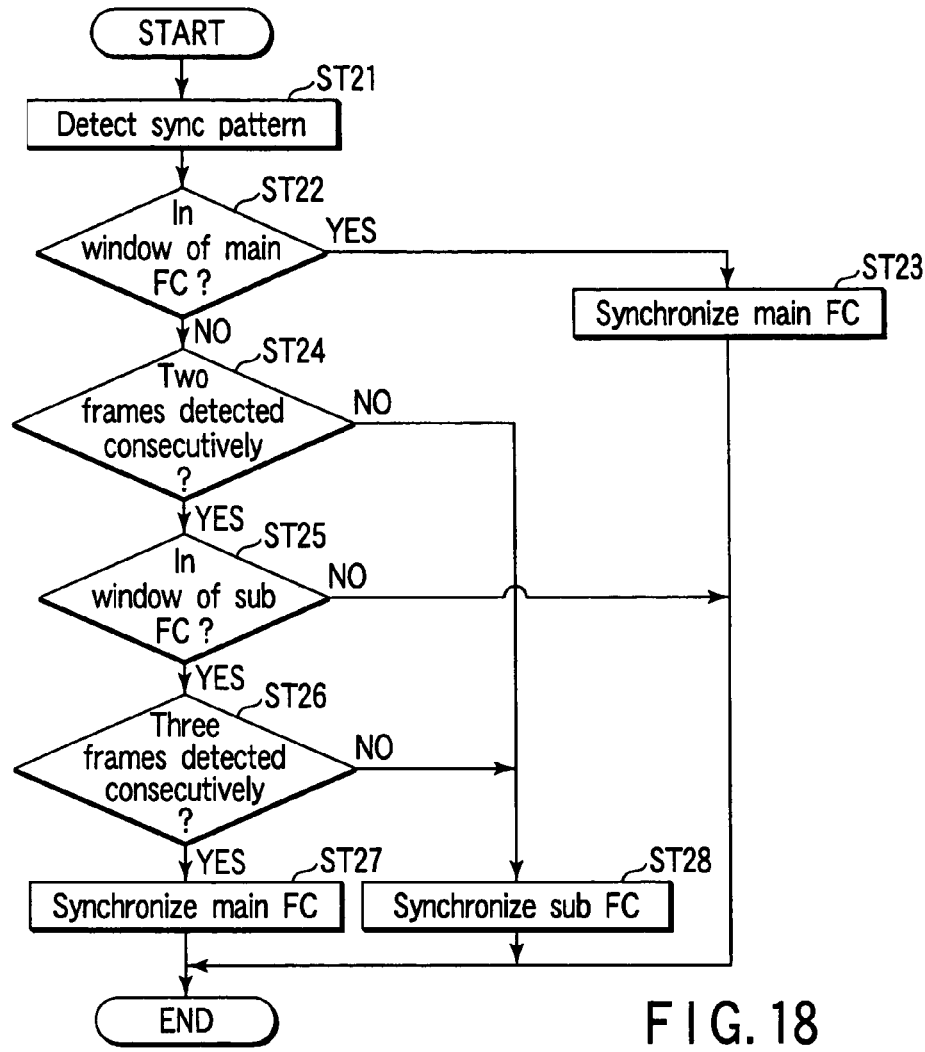
FIG. 18 is a flow chart showing the operation of the sync pattern detection apparatus according to the second embodiment shown in FIGS. 15 and 16.

FIG. 16 is a block diagram showing the detailed arrangement of the sync pattern detection apparatus according to the second embodiment shown in FIG. 15. FIG. 17 is a timing chart showing the operations of the circuits shown in FIG. 16. FIG. 18 is a flow chart showing the operation of the sync pattern detection apparatus according to the second embodiment shown in FIGS. 15 and 16. The system A will be referred to as a main FC, and the system B will be referred to as a sub FC.

When an SYNC is detected in a window output signal G1 from a window generator WG1 (ST21), a 1/N-frequency divider (frame counter) C1 which outputs a playback control sync pattern generates an STB1 through a gate A1 to synchronize the 1/N-frequency divider C1 (YES in ST22) (ST23). In addition, "1" is set to a D-FF circuit FF6. On the other hand, when a SYNC is detected outside the region of the window output signal G1 (NO in ST22), an STB2 is output through a gate A3 of the system B to synchronize a 1/N-frequency divider C2. At this time, the STB2 resets the D-FF circuit FF6. The gate is designed not to generate the STB2 if no SYNC is detected in a window signal G2 of the system B when the D-FF circuit FF6 is reset. When the SYNC is detected in the next window signal G2 again, a D-FF circuit FF7 is set. When the SYNC is generated in the window signal G2 again, the window signal G2 is used to generate the STB1 through a gate A2 so that the 1/N-frequency divider C1 is synchronized. More specifically, when the SYNC that satisfies the frame distance is detected consecutively three times outside the window signal G1 of the window generator WG1 (YES in ST24) (YES in ST25) (YES in ST26), the 1/N-frequency divider C1 of the system A is synchronized (ST27). Accordingly, the timing of the playback control sync pattern output is changed, and the playback control sync pattern is synchronized to the correct SYNC.

Figure 19:
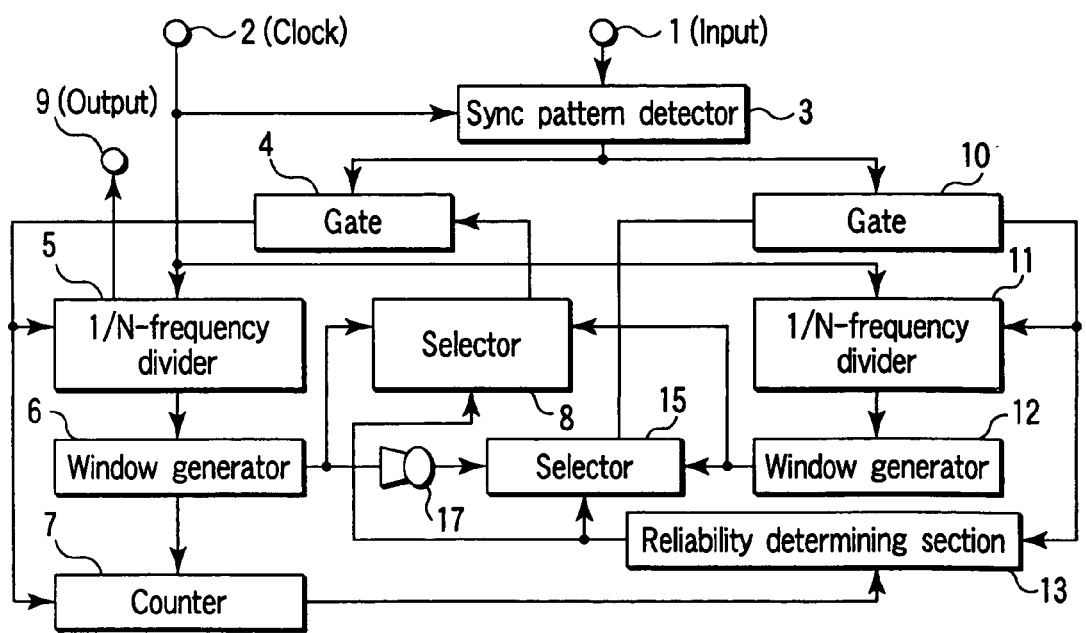
FIG. 19 is a block diagram showing a sync pattern detection apparatus according to the third embodiment of the present invention.

FIG. 19 is a block diagram showing a sync pattern detection apparatus according to the third embodiment of the present invention. The sync pattern detection apparatus shown in FIG. 19 is constituted by adding a function to the sync pattern detection apparatus shown in FIG. 15. Both the sync pattern detection apparatus according to the first embodiment shown in FIG. 11 and the sync pattern detection apparatus according to the second embodiment shown in FIG. 15 have a plurality of detection protection systems. By the plurality of detection protection systems, an asynchronous state is detected in a short time. That is, the plurality of detection protection systems check whether a reliable sync pattern is detected outside the output timing of the playback control sync pattern. In the above-described first and second embodiments, the frame distance must be satisfied consecutively three times to confirm the reliability. The reliability detection method is not limited to this. If the sync pattern contains a complex pattern such as a control code, synchronization can be established when the sync pattern including the control code pattern is detected consecutively twice. Alternatively, assume that synchronization processing is inhibited continuously on the side of the protection system that outputs the playback control sync pattern while the other system cannot detect the sync pattern consecutively three times during a predetermined period. In this case, when the predetermined period has elapsed, synchronization may be established upon detecting the sync pattern consecutively only twice. A counter 7 shown in FIG. 19 detects that the main system is not synchronized during a predetermined period. When it is detected that the main system is not synchronized during a predetermined period, and the sub system detects the sync pattern consecutively twice, the main system is synchronized by the sub system. The main system here includes a gate 4, 1/N-frequency divider 5, and window generator 6. The sub system includes a gate 10, 1/N-frequency divider 11, and window generator 12.

Figure 21:
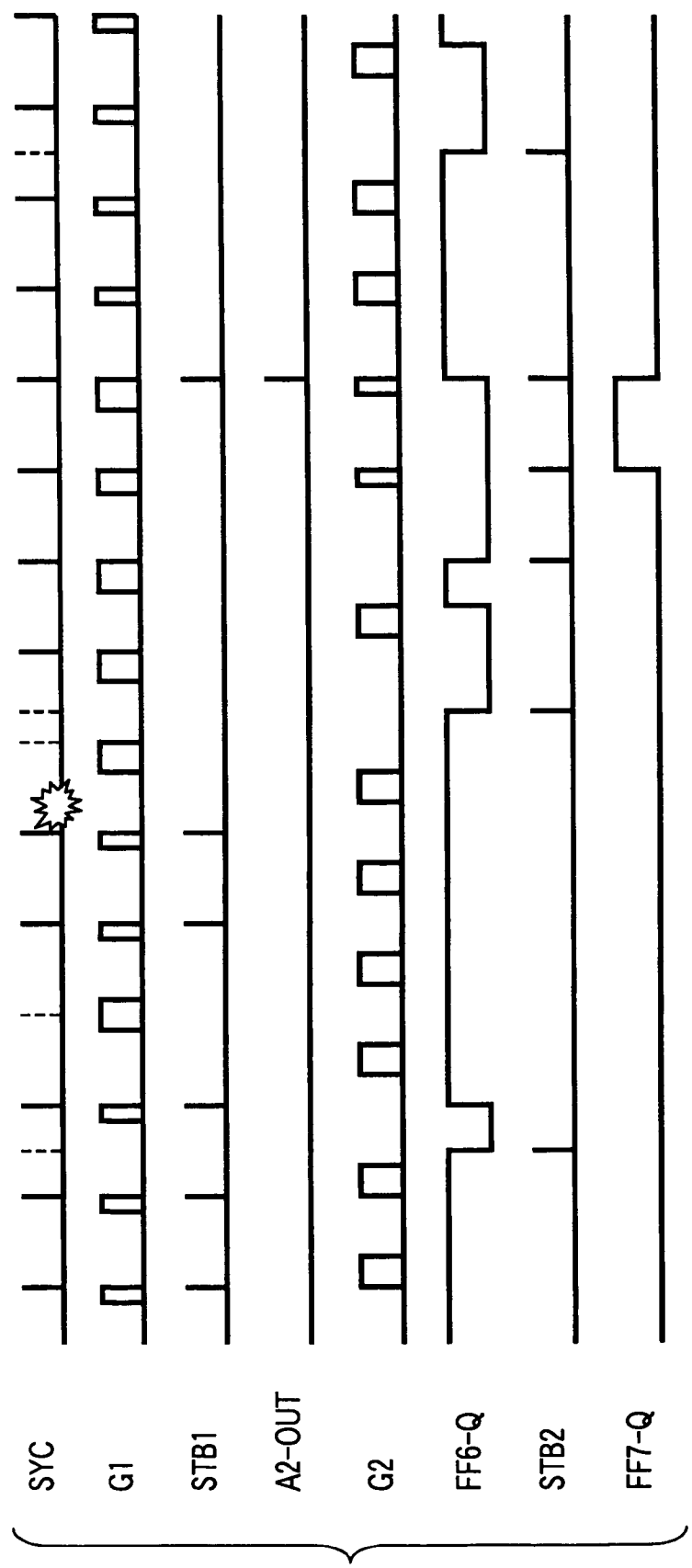
FIG. 21 is a timing chart showing the operation of the sync pattern detection apparatus according to the third embodiment shown in FIG. 20.

FIG. 20 is a block diagram showing the detailed arrangement of the sync pattern detection apparatus according to the third embodiment shown in FIG. 19. FIG. 21 is a timing chart showing the operations of the circuits shown in FIG. 20.

Figure 22:
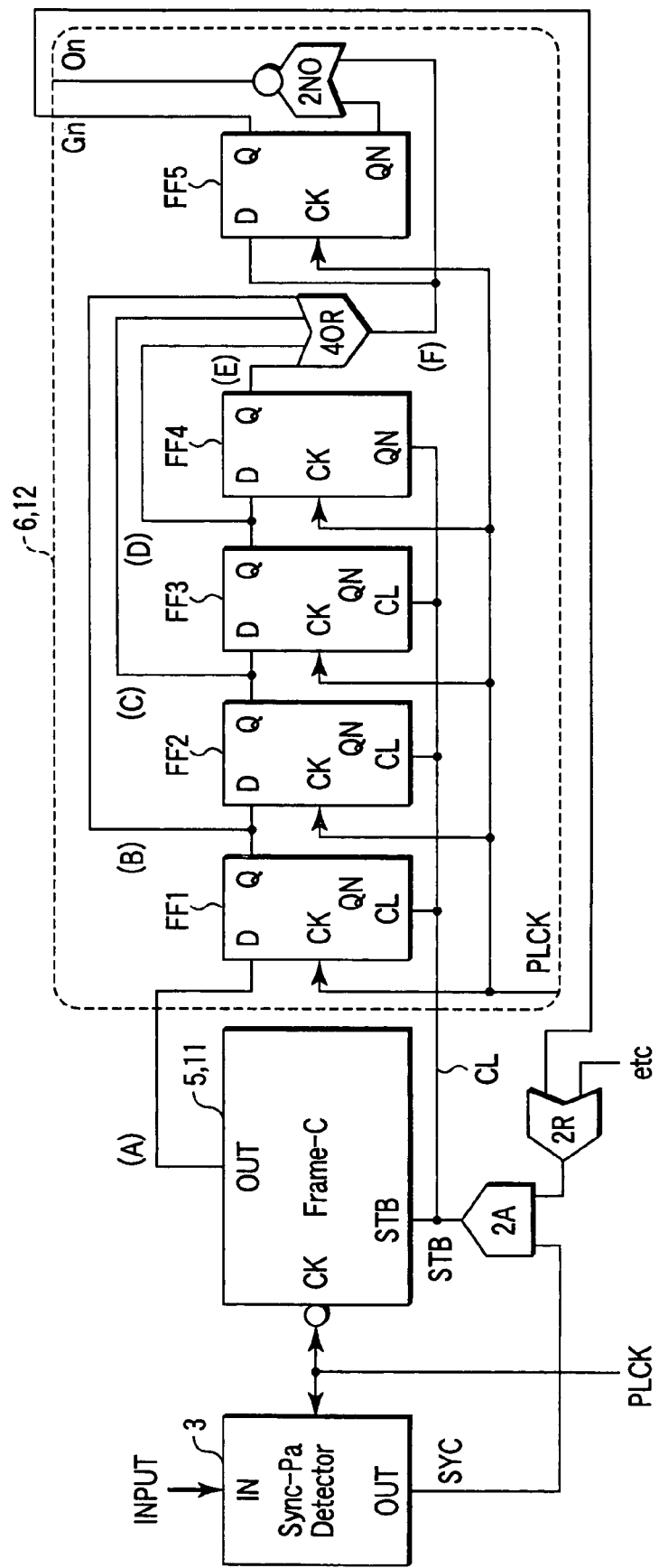
FIG. 22 is a block diagram showing the circuit arrangement of a window generator in each sync pattern detection apparatus.
Figure 23:
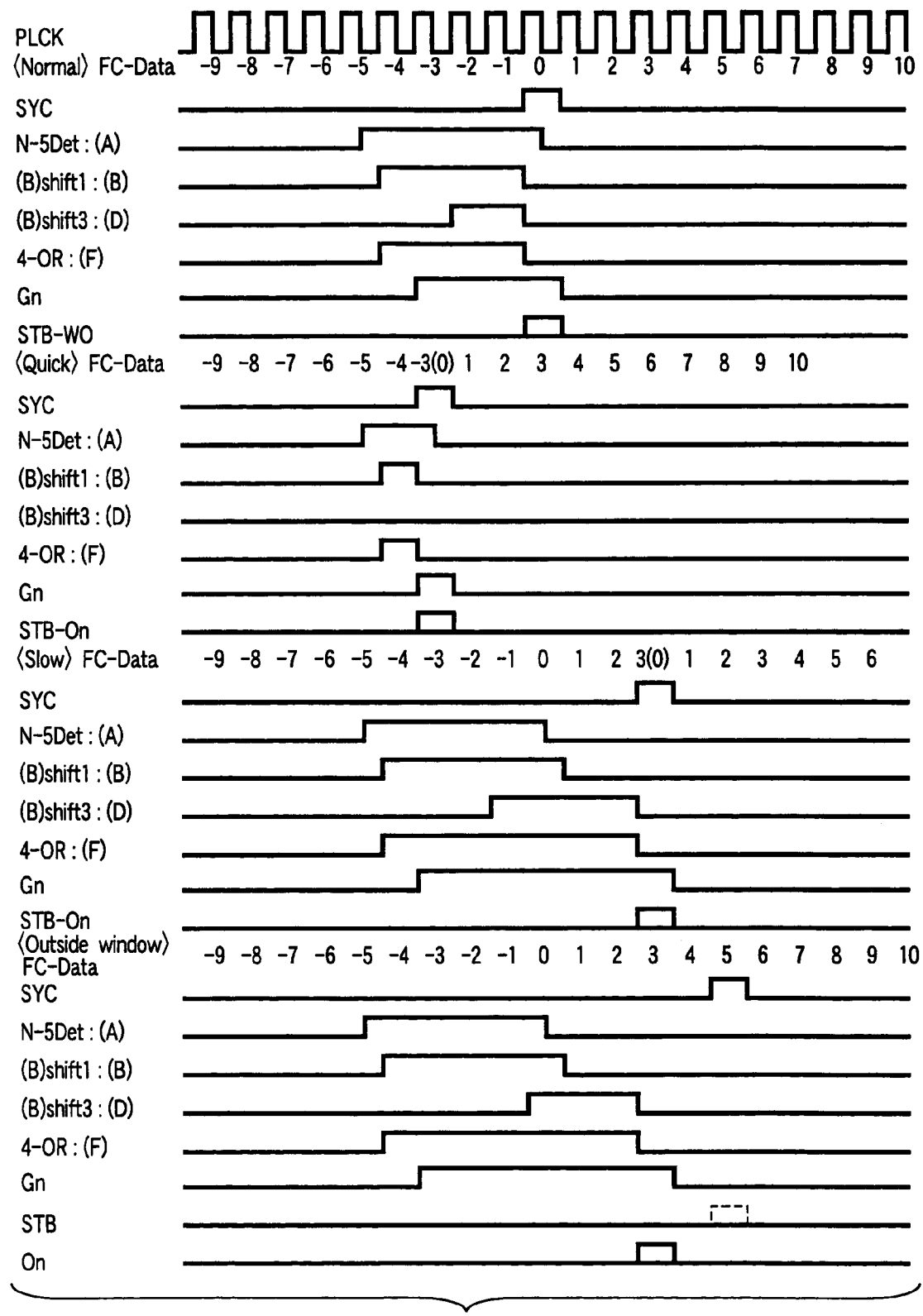
FIG. 23 is a timing chart showing operations when a SYNC is detected in the output of the window generator shown in FIG. 22 and when a SYNC is detected outside the window.

FIG. 22 is a block diagram showing an example of the circuit of a window generator (WGn) in each sync pattern detection apparatus. FIG. 23 is a timing chart showing operations when a SYNC is detected in the output of the window generator shown in FIG. 22 and when a SYNC is detected outside the window. FIG. 22 does not limit the present invention and illustrates only an example of the circuit of the window generator to help easily understand the operation of the present invention.

The sync pattern detection apparatuses according to the embodiments of the present invention are effectively used for synchronization processing in a digital data transmission scheme. However, in a recording medium such as an optical disk having an almost constant recording density in the inner and outer peripheries, if the playback position in the disk changes, the input rate largely changes. To prevent this, along with an increase in read processing speed, a wideband read clock is used. In such a system, when a signal is destroyed by a defect or the like, a read clock error is unavoidable in a self clock scheme. As a result, a data error occurs. As for the data structure, generally, 1 symbol data=a plurality of channel bits. The sync pattern detection protection system which controls symbol division has an important function of minimizing error data due to signal destruction.

Especially, since the recording density recently increases, the redundancy ratio of the correcting code is suppressed to improve the error correcting capability. To do this, the error correcting block capacity tends to increase. It is therefore difficult to distribute errors by interleave processing. That is, how to reduce the asynchronous state is more important.

Examples of the functions and effects of the present invention will be summarized below.

(1) In the conventional sync pattern detection protection system, a synchronization frame counter is prepared. Synchronization is established in accordance with the detection condition of a detected sync pattern. If an asynchronous state is set due to some reason, the time of the asynchronous state (the number of frames that are not synchronized) is counted, thereby designating forcible synchronization by relaxing the condition. Hence, a predetermined time is taken until synchronization. To the contrary, in the present invention, since the asynchronous state is not detected on the basis of time, a synchronous state can be restored in a short time to execute playback processing.

(2) In the conventional sync pattern detection protection system, even when a normal sync pattern is detected, no synchronization processing is executed if the sync pattern is detected outside a window signal. In the present invention, it can be detected in a short time that the normal sync pattern is detected in a short period and that the playback control sync pattern is in an asynchronous state. For this reason, any increase in error data due to the asynchronous state can be prevented.

(3) In the present invention, since the playback control sync pattern output can be set to a predetermined frame counter, the system and circuits can have simple arrangements.

(4) The conventional sync pattern detection protection system eliminates a pseudo sync pattern by a generated window signal. For this reason, when the window signal of the system shifts, an asynchronous state is set. In the present invention, one sync pattern detection protection system executes detection in the range outside the window signal of the other sync pattern detection protection system. Hence, asynchronous state detection and re-synchronization processing can be simultaneously executed.

(5) When reliability detection is executed under a condition that a plurality of frames satisfying the frame distance are detected consecutively, detection may be difficult in a region where insignificant defects continue. In the present invention, the level of reliability detection can be controlled (the detection level can be relaxed). Hence, synchronization is easy.

(6) In the present invention, since various schemes can be combined for reliability detection, reliability detection can be executed at a level appropriate for the situation. Generally, when the sync pattern that satisfies the frame distance is detected consecutively three times, the reliability can be determined as higher than in a system that cannot detect the sync pattern consecutively three times.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A sync pattern detection apparatus comprising:
a sync pattern detection unit configured to detect a sync pattern from an input signal;
a first sync pattern protection units configured to protect the sync pattern detected by the sync pattern detection unit;
a second sync pattern protection unit configured to protect the sync pattern detected by the sync pattern detection unit;
a reliability evaluation unit configured to evaluate reliabilities of a first and a second sync pattern protection situations by the first and second sync pattern protection units; and
a selection unit configured to select a sync pattern protected by one of the first and the second sync pattern protection unit, on the basis of reliability evaluation of the first and the second sync pattern protection situations by the reliability evaluation unit,
wherein the first sync pattern protection unit is synchronized by a sync pattern detected on the basis of a window signal generated at a first timing,
the second sync pattern protection unit is synchronized by a sync pattern detected on the basis of a window signal generated at a second timing that is different from the first timing, and
the second sync pattern protection unit always detects regions corresponding to the window signal generated at the second timing except regions corresponding to the window signal generated at the first timing of the first sync pattern protection unit.

2. An apparatus according to claim 1, wherein each of the first and the second sync pattern protection units comprises:
a gate circuit which supplies the sync pattern detected by the sync pattern detection unit when a specific condition is satisfied,
a frame counter which counts a period of frames of the input signal and is subjected to synchronization processing on the basis of the sync pattern supplied from the gate circuit, and
a window signal generator which generates a window signal to detect a sync pattern, the window signal having a width with n clocks before and after one period, on the basis of a frame counter output from the frame counter, and
the selection unit selects, of the frame counter outputs from the frame counters of the first and the second sync pattern protection units, a most reliable frame counter output and outputs the selected frame counter output as a playback control sync pattern.

3. An apparatus according to claim 1, wherein
the first sync pattern protection units is a main sync pattern protection unit,
the second sync pattern protection units is a sub sync pattern protection unit,
when it is determined that the reliability of a synchronous state of the main sync pattern protection unit is higher than that of the sub sync pattern protection unit, the selection unit selects the sync pattern output from the main sync pattern protection unit and outputs the selected sync pattern as a playback control sync pattern, and
when it is determined that the reliability of the synchronous state of the sub sync pattern protection unit is higher than that of the main sync pattern protection unit, the selection unit causes the sub sync pattern protection unit to synchronize the main sync pattern protection unit.

4. An apparatus according to claim 3, wherein each of the main sync pattern protection unit and the sub sync pattern protection unit comprises
a gate circuit which supplies the sync pattern detected by the sync pattern detection unit when a specific condition is satisfied,
a frame counter which counts a period of frames of the input signal and is subjected to synchronization processing on the basis of the sync pattern supplied from the gate circuit, and
a window signal generator which generates a window signal to detect a sync pattern, the window signal having a width with n clocks before and after one period, on the basis of a frame counter output from the frame counter, and
when it is determined that the reliability of a synchronous state of the sub sync pattern protection unit is higher than that of the main sync pattern protection unit, the selection unit supplies the window signal output from the window signal generator of the sub sync pattern protection unit to the main sync pattern protection unit to synchronize the main sync pattern protection unit.

5. An apparatus according to claim 3, wherein the frame counter of the main sync pattern protection unit comprises
a counter that counts the number of frames which are not subjected to synchronization processing, and
when it is determined from a count result by the counter that the frame counter of the main sync pattern protection unit is not subjected to synchronization processing for a predetermined period, the reliability evaluation unit relaxes a reliability evaluation standard of the synchronous state of the main sync pattern protection unit.

6. An apparatus according to claim 1, wherein the reliability evaluation unit evaluates a state as a reliable state when a predetermined number of sync patterns are consecutively detected by the sync pattern detection unit for a predetermined frame distance.

7. An apparatus according to claim 1, wherein the reliability evaluation unit evaluates a state as a reliable state when at least one of a case in which a specific control signal pattern is contained in the sync pattern, a case in which a detection timing of the sync pattern substantially matches a frame distance, and a case in which the sync pattern is detected consecutively at least three times is satisfied.

8. A sync pattern detection method applied to an apparatus comprising a sync pattern detection unit configured to detect a sync pattern from an input signal, first sync pattern protection units configured to protect the sync pattern detected by the sync pattern detection unit, and a second sync pattern protection unit configured to protect the sync pattern detected by the sync pattern detection unit comprising:
evaluating reliabilities of the first and the second sync pattern protection situations by the first and the second sync pattern protection units; and
selecting a sync pattern protected by one of the first and the second sync pattern protection units, on the basis of reliability evaluation of the first and the second sync pattern protection situations,
wherein the first sync pattern protection unit is synchronized by a sync pattern detected on the basis of a window signal generated at a first timing,
the second sync pattern protection unit is synchronized by a sync pattern detected on the basis of a window signal generated at a second timing that is different from the first timing, and
the second sync pattern protection unit always detects regions corresponding to the window signal generated at the second timing except regions corresponding to the window signal generated at the first timing of the first sync pattern protection unit.

9. A method according to claim 8, wherein each of the first and the second sync pattern protection units comprises
a gate circuit which supplies the sync pattern detected by the sync pattern detection unit when a specific condition is satisfied,
a frame counter which counts a period of frames of the input signal and is subjected to synchronization processing on the basis of the sync pattern supplied from the gate circuit, and
a window signal generator which generates a window signal to detect a sync pattern, the window signal having a width with n clocks before and after one period, on the basis of a frame counter output from the frame counter, and
the method further comprises selecting, of the frame counter outputs from the frame counters of the first and the second sync pattern protection units, a most reliable frame counter output and outputs the selected frame counter output as a playback control sync pattern.

10. A method according to claim 8, wherein
the first sync pattern protection units is a main sync pattern protection unit,
the second sync pattern protection units is a sub sync pattern protection unit, and
the method further comprises
when it is determined that the reliability of a synchronous state of the main sync pattern protection unit is higher than that of the sub sync pattern protection unit, selecting the sync pattern output from the main sync pattern protection unit and outputting the selected sync pattern as a playback control sync pattern, and
when it is determined that the reliability of the synchronous state of the sub sync pattern protection unit is higher than that of the main sync pattern protection unit, causing the sub sync pattern protection unit to synchronize the main sync pattern protection unit.

11. A method according to claim 10, wherein
each of the main sync pattern protection unit and the sub sync pattern protection unit comprises
a gate circuit which supplies the sync pattern detected by the sync pattern detection unit when a specific condition is satisfied,
a frame counter which counts a period of frames of the input signal and is subjected to synchronization processing on the basis of the sync pattern supplied from the gate circuit, and
a window signal generator which generates a window signal to detect a sync pattern, the window signal having a width with n clocks before and after one period, on the basis of a frame counter output from the frame counter, and
the method further comprises
when it is determined that the reliability of a synchronous state of the sub sync pattern protection unit is higher than that of the main sync pattern protection unit, supplying the window signal output from the window signal generator of the sub sync pattern protection unit to the main sync pattern protection unit to synchronize the main sync pattern protection unit.

12. A method according to claim 10, wherein the frame counter of the main sync pattern protection unit counts the number of frames which are not subjected to synchronization processing, and when it is determined from a count result that the frame counter of the main sync pattern protection unit is not subjected to synchronization processing for a predetermined period, a reliability evaluation standard of the synchronous state of the main sync pattern protection unit is relaxed.

13. A method according to claim 8, wherein a state is evaluated as a reliable state when a predetermined number of sync patterns are consecutively detected by the sync pattern detection unit for a predetermined frame distance.

14. A method according to claim 8, wherein a state is evaluated as a reliable state when at least one of a case in which a specific control signal pattern is contained in the sync pattern, a case in which a detection timing of the sync pattern substantially matches a frame distance, and a case in which the sync pattern is detected consecutively at least three times is satisfied.

* * * * *